US005696433A

United States Patent [19]

Patino

[11] Patent Number: 5,696,433
[45] Date of Patent: Dec. 9, 1997

[54] METHOD AND APPARATUS FOR EXPANDED BATTERY RECOGNITION IN A BATTERY CHARGING SYSTEM

[75] Inventor: Joseph Patino, Pembroke Pines, Fla.

[73] Assignee: Motorola, Inc., Schaumburg, Ill.

[21] Appl. No.: 813,138

[22] Filed: Mar. 7, 1997

[51] Int. Cl.[6] ............ H01M 10/46; H01M 10/48
[52] U.S. Cl. ............ 320/31; 320/2; 320/35; 429/90
[58] Field of Search ............ 320/2, 31, 35, 320/48; 429/7, 90

[56] References Cited

U.S. PATENT DOCUMENTS

| 4,006,396 | 2/1977 | Bogut | 320/2 |
|---|---|---|---|
| 4,668,902 | 5/1987 | Zeller, Jr. | 320/31 |
| 5,166,623 | 11/1992 | Ganio | 324/427 |
| 5,184,059 | 2/1993 | Patino et al. | 320/15 |
| 5,371,453 | 12/1994 | Fernandez | 320/5 |
| 5,411,816 | 5/1995 | Patino | 429/7 |
| 5,460,901 | 10/1995 | Syrjälä | 429/90 |
| 5,471,128 | 11/1995 | Patino et al. | 320/13 |
| 5,576,610 | 11/1996 | Patino et al. | 320/31 |

*Primary Examiner*—Peter S. Wong
*Assistant Examiner*—Patrick Law
*Attorney, Agent, or Firm*—Barbara R. Doutre

[57] ABSTRACT

A battery charging system (200) provides an expanded range of battery recognition. Battery (204) includes two zener diodes (224, 226) coupled in a cathode-to-cathode configuration between the battery's capacity resistor 220 and the battery's thermistor 222. The charger 202 biases the first zener diode (224) while latching the second zener diode (226) such that the value of the latched zener diode can be determined by the A/D ports (234, 236) of the charger (202). The charger (202) then biases the second zener diode (226) and latches the first zener diode (224) so that the value of the first latched zener diode (224) can be determined through A/D ports (234, 236) of the charger. The thermistor (222) and capacity resistor (220) are read by the A/D ports (234, 236) when neither of the diodes (224, 226) is biased. Hence, the charging system (200) provides four battery ID parameters with which to identify the battery.

9 Claims, 4 Drawing Sheets

METHOD AND APPARATUS FOR EXPANDED BATTERY RECOGNITION IN A BATTERY CHARGING SYSTEM

TECHNICAL FIELD

This invention relates to batteries and battery charging systems.

BACKGROUND

Referring to FIG. 1, there is shown a prior art block diagram for a battery charging system 100 consisting of a charger 102, radio battery 104 and radio 106. Radio 106 contains positive (B+) and negative (B−) battery terminals which are coupled to radio battery 104 via battery contacts 108 and 110, respectively. Battery 104 contains one or more battery cells 112, which dictate the voltage and current capacity of battery 104. It is very common for batteries which are used in portable radios to have a thermistor (Rt) 114, a battery capacity resistor (Rc) 116, and a short circuit protection diode (D1) 118. The thermistor 114 is typically monitored by the charger 102 to determine the temperature of the battery. The capacity resistor (Rc) 116 is typically monitored by the charger 102 to determine the capacity of the battery 104, prior to the battery being charged. The capacity resistor 114 also operates as a battery recognition identifier which identifies the battery type, number of cells, battery chemistry, and recommended charge rate. The battery charger 102 upon determining the battery parameters (e.g., 1000 milli-amp-hours) through capacity resistor (Rc) 116 will select the proper charging rate to use in order to optimally charge the battery.

Charger 102 consists of a charger monitor circuit 120, which comprises a microprocessor or microcontroller as known in the art along with appropriate control software. Charger monitor circuit 120 controls a charger control circuit 122 which provides charge current to battery 104. A control signal is transmitted by charger monitor circuit 120 to charger control circuit 122 via bus 124, this control signal informs the charger control circuit 122 as to how much current to source via line 126 to battery 104.

Charging system 100 utilizes four interconnections between the charger 102 and the battery 104 labeled B+, Rc Rt, and B− (ground) connections referenced as 134, 136, 138, and 140 respectively. Charger monitor circuit 120 contains three analog to digital (A/D) ports 128, 130, and 132. A/D port 128 monitors the voltage on the B+ line 134. A/D port 130 senses the resistance of the capacity resistor Rc 116. A/D port 132 senses the resistance of thermistor Rt 114, as its resistance changes once the battery begins charging. A/D ports 130 and 132 each include external pull-up resistors (shown here pulled up to 5 volts) which are used to determine the resistance of Rc 116 and Rt 114.

The prior art charging scheme 100 is limited as to the number of distinct Rc values which can be determined. This limitation is due in part to the component tolerances of the Rc resistor, the pull-up resistor, and the resolution of the A/D port which is typically an 8-bit A/D having a finite resolution of 255 steps. For example, in the charging system of FIG. 1, in a typical 5 volt system utilizing an external 5 percent, 10 kilo-ohm pull-up resistor on the A/D port 130, the number of distinct resistor values for the capacity resistor is limited to thirteen. As the number of different battery chemistries and capacities continue to expand and diversify, the need for an expanded battery recognition parameter increases.

Accordingly, there is a need for a battery charging system with expanded battery recognition. Such a system would allow chargers to operate on a wider scale of batteries having various chemistries, capacities, number of cells, and charge rates.

DETAILED DESCRIPTION OF THE PREFERRED EMBODIMENT

Figure 2:
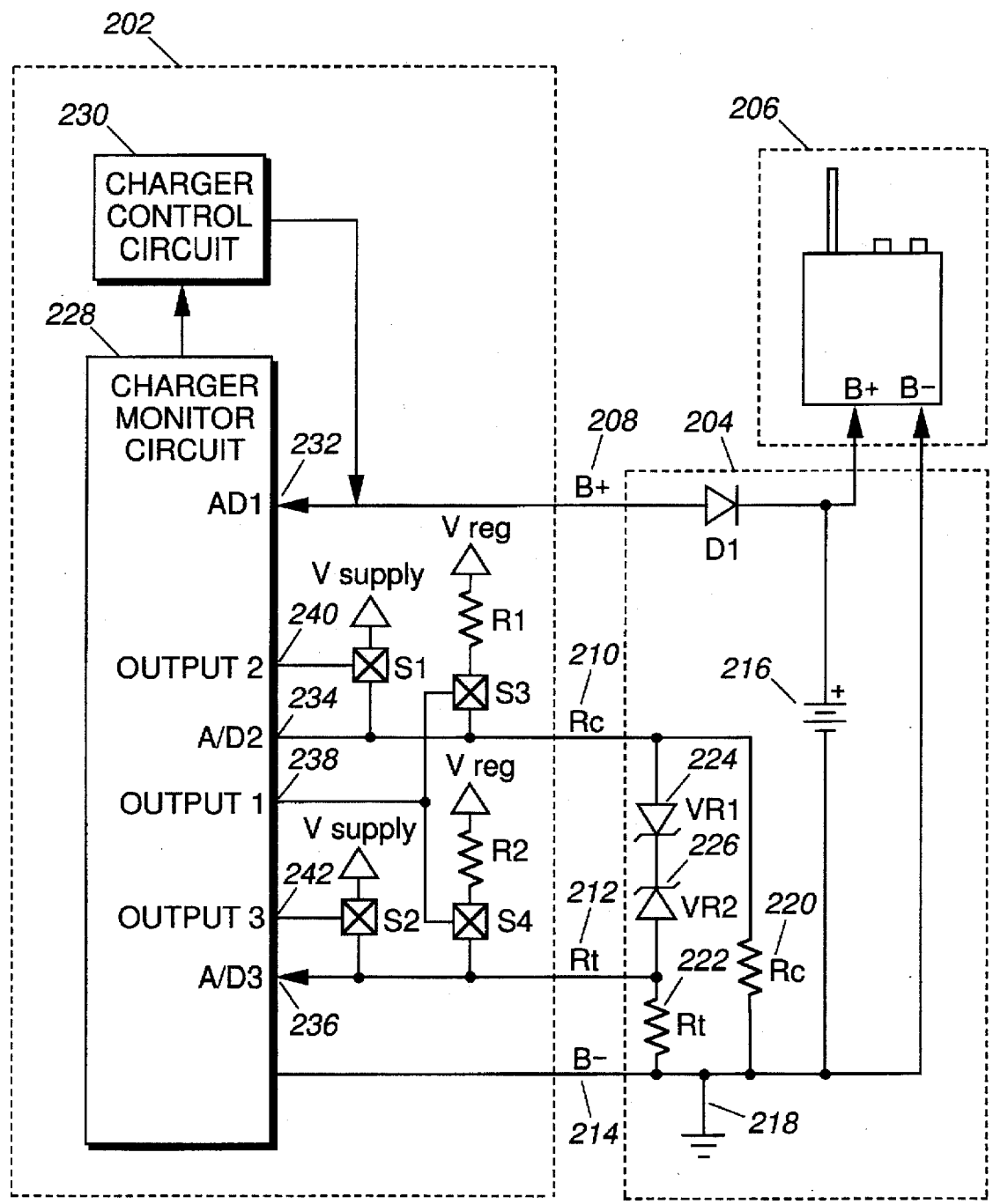
FIG. 2 is a schematic of a battery charging system in accordance with the present invention.

Referring FIG. 2, there is shown a battery charging system 200 in accordance with the present invention. System 200 is a four contact charging scheme comprising a charger 202, a battery 204, and a radio 206. Radio 206 may be coupled, as shown, to the battery 204 during the charging process or may be removed from the battery if desired. Interconnection between the charging terminals of charger 202 and the charging contacts of battery 204 is made through four nodes, labeled B+, Rc, Rt, and B−, which are referenced by designators 208, 210, 212, and 214 respectively. Battery 204 includes short circuit protection diode (D1) coupled in the B+ line and battery cells 216 coupled between the B+ and ground potential 218. Battery 204 further includes a capacity resistor (Rc) 220 coupled between the Rc node 210 and ground potential 218, as well as a thermistor (Rt) 222 coupled between the Rt node 212 and ground potential 218. The thermistor 222 indicates the battery's temperature while the capacity resistor indicates the capacity of the battery. In accordance with the present invention, battery 204 also includes two zener diodes 224, 226 (labeled VR1 and VR2 respectively). In accordance with the present invention these diodes 224, 226 are coupled together through their cathodes between the Rc node 210 and the Rt node 212. The anode of VR1 is coupled to the Rc node 210, while the anode of VR2 is coupled to the Rt node 212.

The charger 202 includes charger monitor circuit 228 and charger control circuit 230. Charger monitor circuit 228 includes three analog to digital (A/D) ports labeled A/D1, A/D2, and A/D3 and referenced by designators 232, 234, and 236 respectively. A/D1 monitors the battery voltage through the B+ node. In accordance with the present invention, three outputs labeled output1, output2, output3, referenced by designators 238, 240 and 242 respectively, are used to control a plurality of selectable switches which bias or latch the diodes VR1, VR2 such that two additional battery parameter identifiers are provided. Output2 and output3 control switches S1 and S2 respectively such that A/D2 can be pulled to supply (Vsupply) when S1 is closed or A/D3 can be pulled to supply (Vsupply) when S2 is closed. Switches S1 and S2 are controlled such that when S1 is closed, S2 is open and when S1 is open, S2 is closed.

Output1 controls both switches S3 and S4 to switch a regulated supply voltage (Vreg) onto or off of A/D2 and A/D3 through pull up resistors R1 and R2 respectively. Switches S3 and S4 are preferably controlled such that they are either both open or both closed at the same time to allow for the use of one switch. Alternatively, switches S3 and S4 could be controlled through separate lines if desired. All the switches S1, S2, S3 and S4 can be implemented with well known switch circuitry, such as npn or pnp transistors.

The charging apparatus 200 of the present invention uses the capability of the microprocessor to read an A/D voltage to calculate a corresponding resistance. By switching the pull up resistors R1, R2 independently of the supply lines (Vsupply), distinct values for Rt, Rc, VR1, and VR2 can be determined. As an example, for a system operating at a supply voltage (Vsupply) of 12 volts and a regulated voltage (Vreg) of 5 volts, the zener diode values can be selected between 5 and 11.4 volts. Accordingly each zener diode VR1, VR2 and can take on one of eight distinct vales: 5.6 volts. 6.2 volts, 6.8 volts, 7.5 volts, 8.2 volts, 9.1 volts, 10 volts, and 11 volts.

Figure 3:
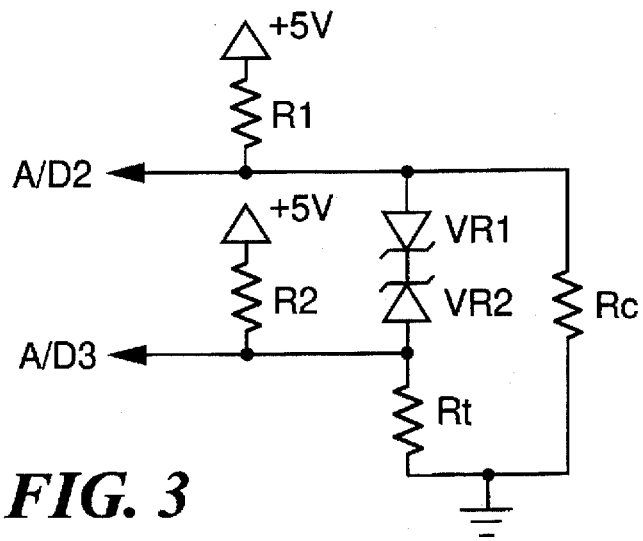
FIG. 3 is a partial schematic of FIG. 2 indicating the resulting circuit achieved when switches S1 and S2 are open and switches S3 and S4 are closed.
Figure 4:
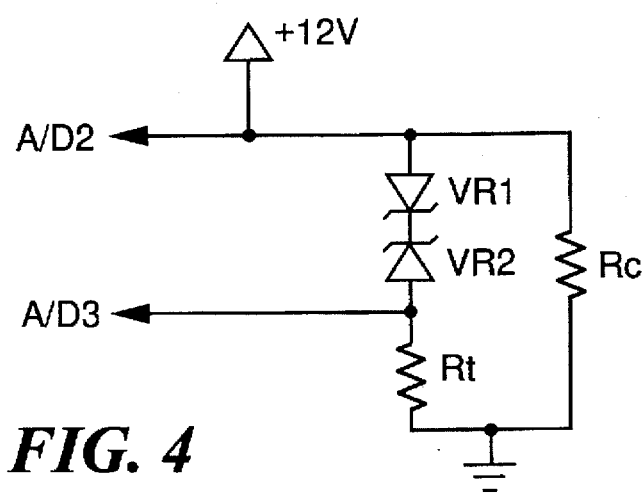
FIG. 4 is a partial schematic of FIG. 2 indicating the resulting circuit achieved when switches S2, S3, and S4 are open and switch S1 is closed.
Figure 5:
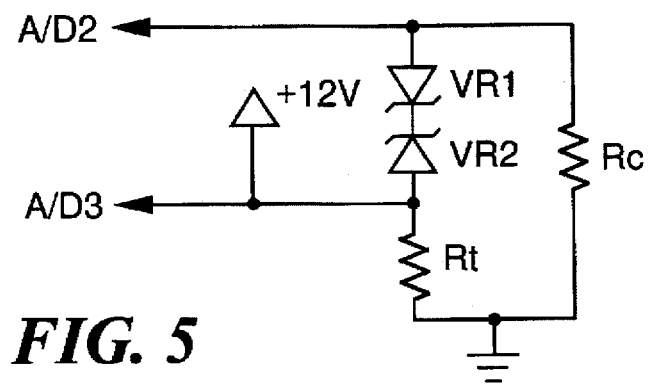
FIG. 5 is a partial schematic of FIG. 2 indicating the resulting circuit achieved when switches S1, S3, and S4 are open and switch S2 is closed.

The following example utilizes a 12 volt supply (Vsupply) and a 5 volt regulated supply (Vreg) to demonstrate the three states available with the charging system 200 of the present invention. FIGS. 3, 4, and 5 show that portion of system 200 which varies according to the different states of the switches S1, S2, S3, and S4.

STATE 1 (refer to FIG. 3):

To determine the values of Rc and Rt, the charger controls output1, output2, and output3 so as to close switches S3 and S4 and open switches S1 and S2. Since, for this example, VR1 and VR2 were selected to be greater than 5 volts, they have no effect on the voltages read at ports A/D1 or A/D2. Thus, Rc and Rt are read in a typical manner:

$$Rc = \frac{VA/D2 * R1}{5 - VA/D2}$$

$$Rt = \frac{VA/D3 * R2}{5 - VA/D3}$$

STATE 2 (Refer to FIG. 4):

To determine the value of VR1, the charger controls output1, output2, and output3 so as to close switch S2 and open switches S1, S3, and S4. In this configuration, VR2 is forward biased and acts as a diode with a voltage drop of approximately 0.6 volts and VR1 latches. Accordingly VR1 is solved by the following equation:

$$VR1 = VA/D3 - VA/D2 - 0.6 \text{ volts}$$

STATE 3 (Refer to FIG. 5):

To determine the value of VR2, the charger controls output1, output2, and output3 so as to close switch S1 and open switches S2, S3, and S4. In this configuration, VR1 is forward biased as a diode with a voltage drop of approximately 0.6 volts, and VR2 is latched. Hence, VR2 is solved by the following equation:

$$VR2 = VA/D2 = VA/D3 - 0.6 \text{ volts}$$

Once the VR1 and VR2 values are determined, the charger 202 can commence charging the battery 204 as identified through four battery ID parameters Rt, Rc, VR1, and VR2. Once charging begins the charger 202 can revert back to state 1 and continue to monitor the battery temperature, through Rt, without any loss of resolution to the temperature measuring scheme. Since the battery type does not change once charging has commenced, there is no need for the charger to recheck the Rc, VR1, and VR2 battery ID parameters until a new battery is inserted.

The charging system 200 of the present invention allows three distinct variables to be defined, Rc, VR1, and VR2. For the 12 volt supply and the 5 volt regulated supply example, this would provide up to 13 distinct values for Rc, 8 distinct values for VR1, and 8 distinct values for VR2. Different battery ID parameter identifiers, such as capacity, cutoff voltage, and number of cells are assigned to the three variables Rc, VR1, and VR2 to provide expanded battery recognition to the charging system 200. The three variables Rc, VR1, and VR2 can be used for a multitude of other battery identifiers as well, such as vendor data, test information, low voltage threshold, or radio type identification if desired.

Figure 6:
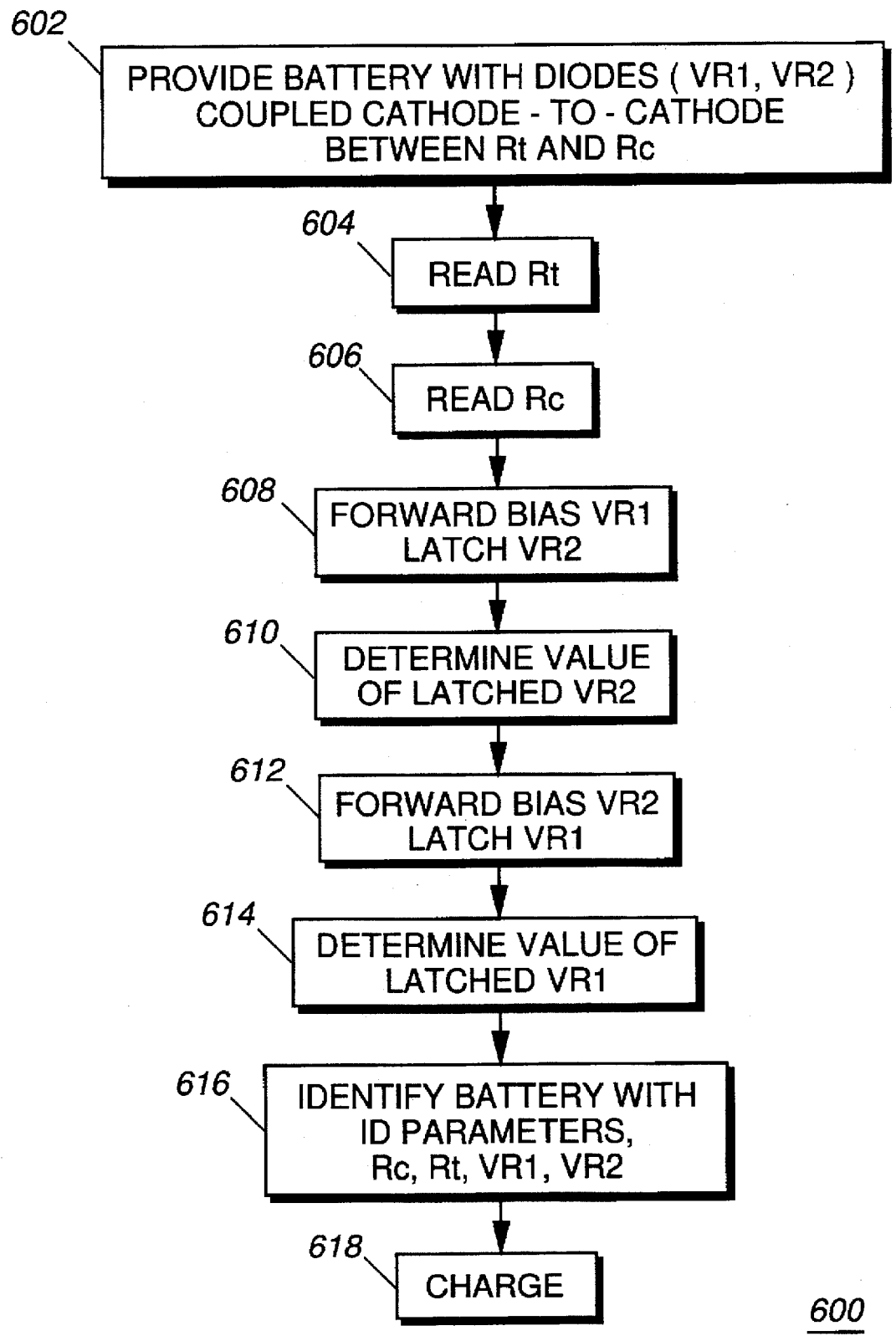
FIG. 6 is a flowchart showing the steps for expanding battery recognition in a charging system in accordance with the present invention.

Referring now to FIG. 6 there is shown a method 600 of expanding battery identifier parameters in accordance with the present invention in a charging system in which the battery includes a thermistor and a capacity resistor and the charger includes A/D ports. Step 602 begins by providing first and second diodes, VR1 and VR2, coupled in a cathode-to-cathode configuration in between the thermistor (Rt) and the capacity resistor (Rc) of the battery. At step 604, read the Rt value through the first A/D port and at step 606 read the Rc value through the second A/D port. At step 608, forward bias diode VR1 and latch diode VR2. At step 610, determine the value of zener diode VR2 through the first and second A/D ports of the charger. At step 612, forward bias diode VR2 and latch diode VR1. At step 614, determine the value of zener diode VR1 through the first and second A/D ports of the charger. At step 616, identify the battery using the values determined for battery ID parameters Rt, Rc, VR1, and VR2. Begin charging at step 618 the battery based on these parameters.

Figure 1:
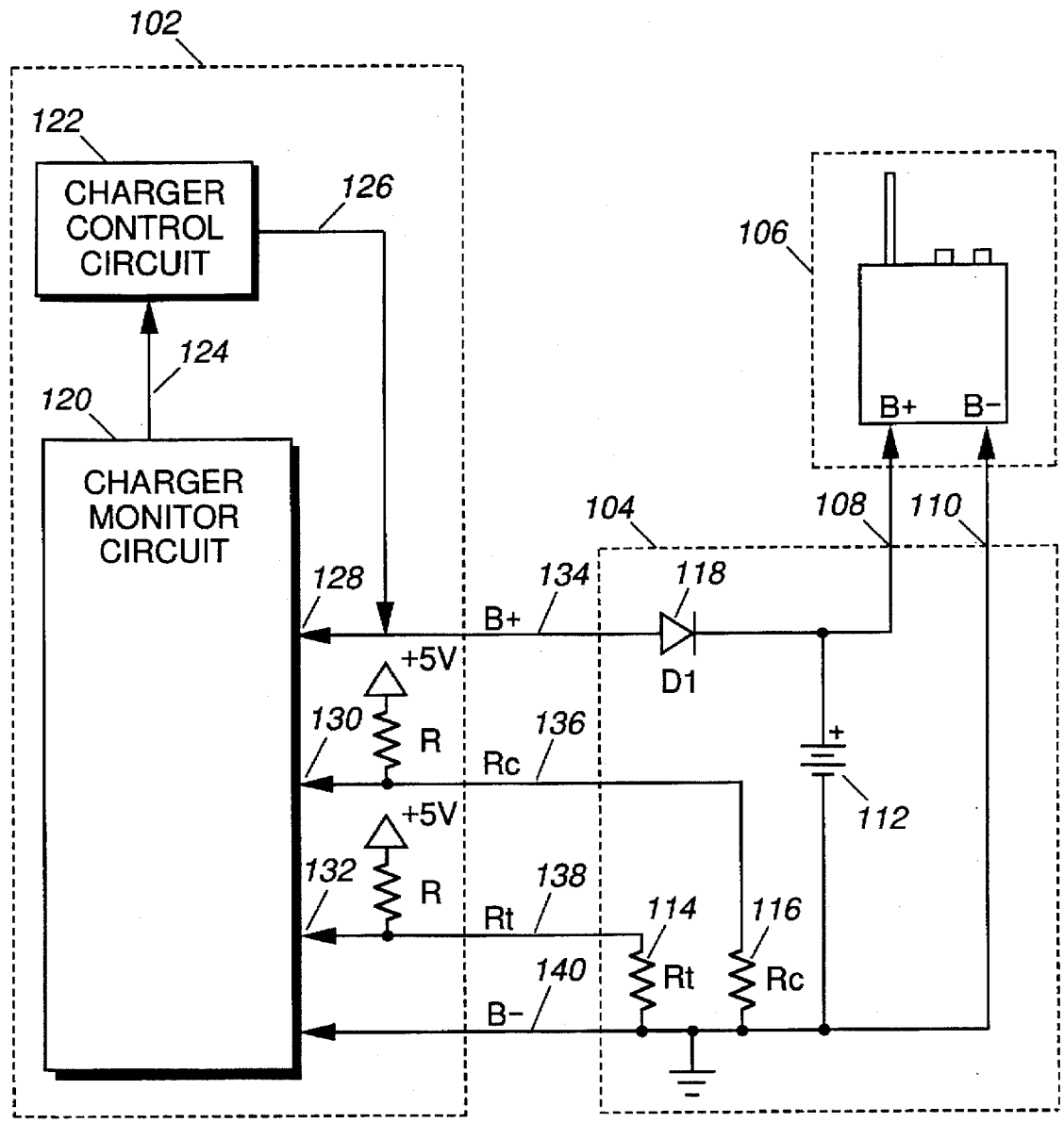
FIG. 1 is a schematic of a prior art battery charging system.

By coupling two zener diodes in a cathode-to-cathode configuration in between the RC and Rt resistors of the battery as described by the invention, an expanded battery identifier scheme has been provided. Accordingly, the battery charging system 200 of the present invention provides a unique approach to charging a battery which allows two extra and independent identifier elements (VR1 and VR2) to expand the present battery recognition scheme. The apparatus and technique described by the invention accomplish the goal of increased identifiers without the use of additional contacts or reduced resolution to the temperature reading capability of the circuit. The charging system 200 described by the invention has the additional advantage of backward compatibility in that the prior art model of FIG. 1 will still charge new batteries, and the new chargers will still charge the old batteries.

What is claimed is:

1. A method of expanding battery identifier parameters in a charging system having a battery including a thermistor (Rt) and a capacity resistor (Rc) and a charger including first and second analog-to-digital (A/D) ports, comprising the steps of:

at the battery:
  providing first and second zener diodes coupled in a cathode-to-cathode configuration in between the thermistor and the capacity resistors of the battery; and at the charger:
  reading the Rt value and the Rc value through first and second A/D ports of the charger respectively;
  forward biasing the first zener diode and latching the second zener diode;

determining the value of the second latched zener diode through the first and second A/D ports of the charger;

forward biasing the second zener diode and latching the first zener diode;

determining the value of the first latched zener diode through the first and second A/D ports of the charger;

identifying the battery using the values determined for Rc, Rt, the first latched zener diode, and the second latched zener diode.

2. The method of claim 1, further comprising the step of charging the battery based on the values determined for Rc, Rt, the first latched zener diode, and the second latched zener diode.

3. A battery charging system, comprising:

a charger, including:
  first and second A/D ports;
  first and second switches coupled to the first and second A/D ports for alternately switching on a supply voltage at the first and second A/D ports;
  third and fourth switches coupled to the first and second A/D ports for switching in first and second pull up resistors onto the first and second A/D ports respectively;

a battery coupled to the charger, the battery including:
  a capacity resistor coupled between ground potential and the first A/D port of the charger;
  a thermistor coupled between ground potential and the second A/D port of the charger;
  first and second zener diodes coupled between the capacity resistor and the thermistor in a cathode-to-cathode configuration, the first zener diode having an anode coupled to the first A/D port of the charger, the second zener diode having an anode coupled to the second A/D port of the charger; and
  the first zener diode, the second zener diode, and the capacity resistor providing battery identifier parameters to the charging system.

4. A battery charging system as described in claim 3, wherein the charger determines the charge rate based on the battery identifier parameters.

5. A battery charging system as described in claim 4, wherein the charger determines the value of the first zener diode, through the first and second A/D ports, by forward biasing the second zener diode and latching the first zener diode.

6. A battery charging system as described in claim 5, wherein the charger determines the value of the second zener diode, through the first and second A/D ports, by forward biasing the first zener diode and latching the second zener diode.

7. A battery charging system as described in claim 3, wherein the charger determines the value of the thermistor and the capacity resistor, through the first and second A/D ports, by switching in the first and second pull up resistors onto the first and second A/D ports respectively.

8. A charging system, comprising:

a battery including:
  first and second zener diodes coupled in a cathode-to-cathode configuration, each of the first and second zener diodes having an anode;
  a capacity resistor (Rc) coupled between ground potential and the anode of the first zener diode;
  a thermistor (Rt) coupled between ground potential and the anode of the second zener diode;

a charger including:
  first and second A/D ports;
  a first selectable pull up resistor coupled to the first A/D port;
  a second selectable pull up resistor coupled to the second A/D port, the first and second selectable pull up resistors biasing neither of the zener diodes when selected, the first and second A/D ports determining the value of the capacity resistor and the thermistor respectively when selected;
  a first switching circuit coupled to the first A/D port for biasing the first zener diode and latching the second zener diode such that the value of the second zener diode can be determined by the first and second A/D ports;
  a second switching circuit coupled to the second A/D port for biasing the second zener diode and latching the first zener diode such that the first and second A/D ports can determine the value of the first zener diode; and wherein the value of the capacity resistor, the value of the thermistor, the value of the first zener diode, and the value of the second zener diode provide battery identification parameters.

9. The charging system of claim 8, wherein the charger utilizes the battery identification parameters to determine a charging rate.

* * * * *